June 12, 1956  J. D. HUFFINES  2,750,055
REFUSE COMPRESSOR MECHANISM FOR VEHICLES
Filed Dec. 24, 1953  4 Sheets-Sheet 1
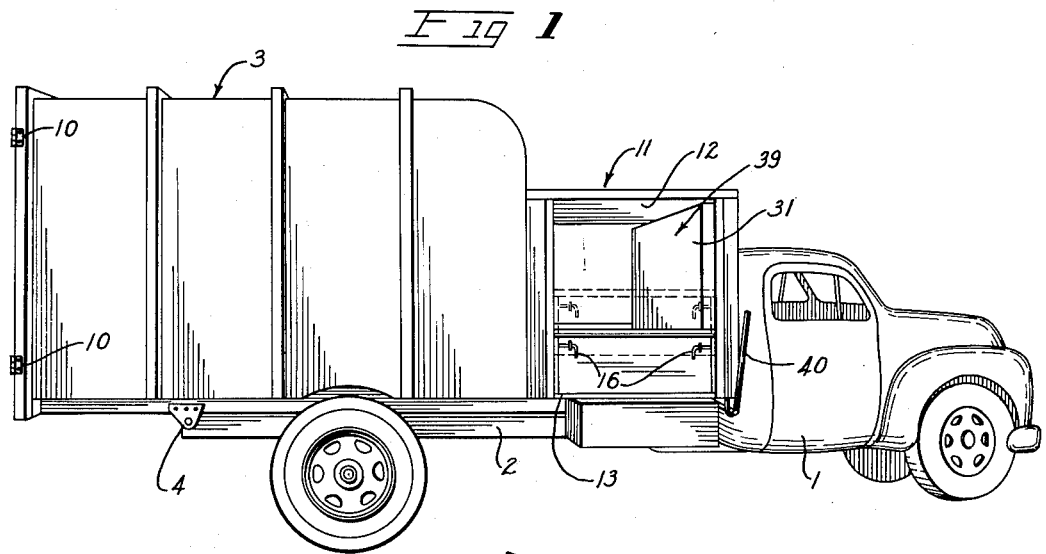
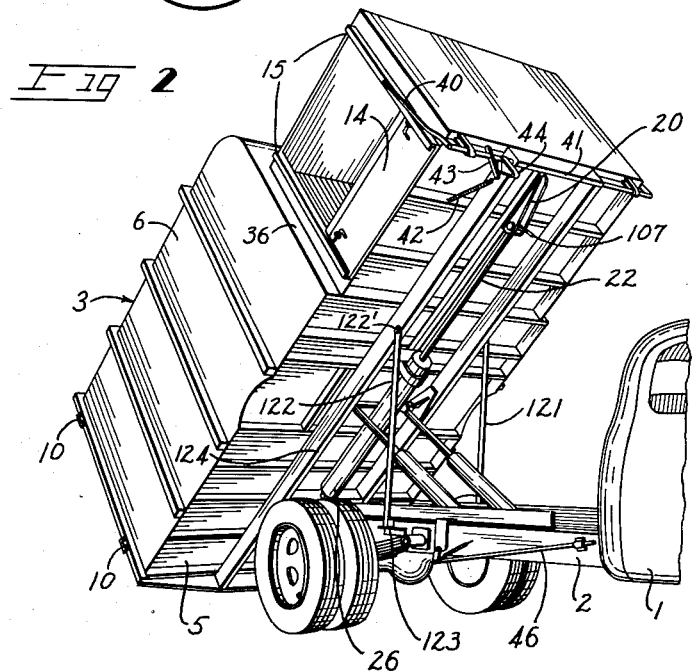
James Donle Huffines
INVENTOR.
BY
Wayland D. Keith
HIS AGENT June 12, 1956      J. D. HUFFINES      2,750,055
REFUSE COMPRESSOR MECHANISM FOR VEHICLES
Filed Dec. 24, 1953      4 Sheets-Sheet 2
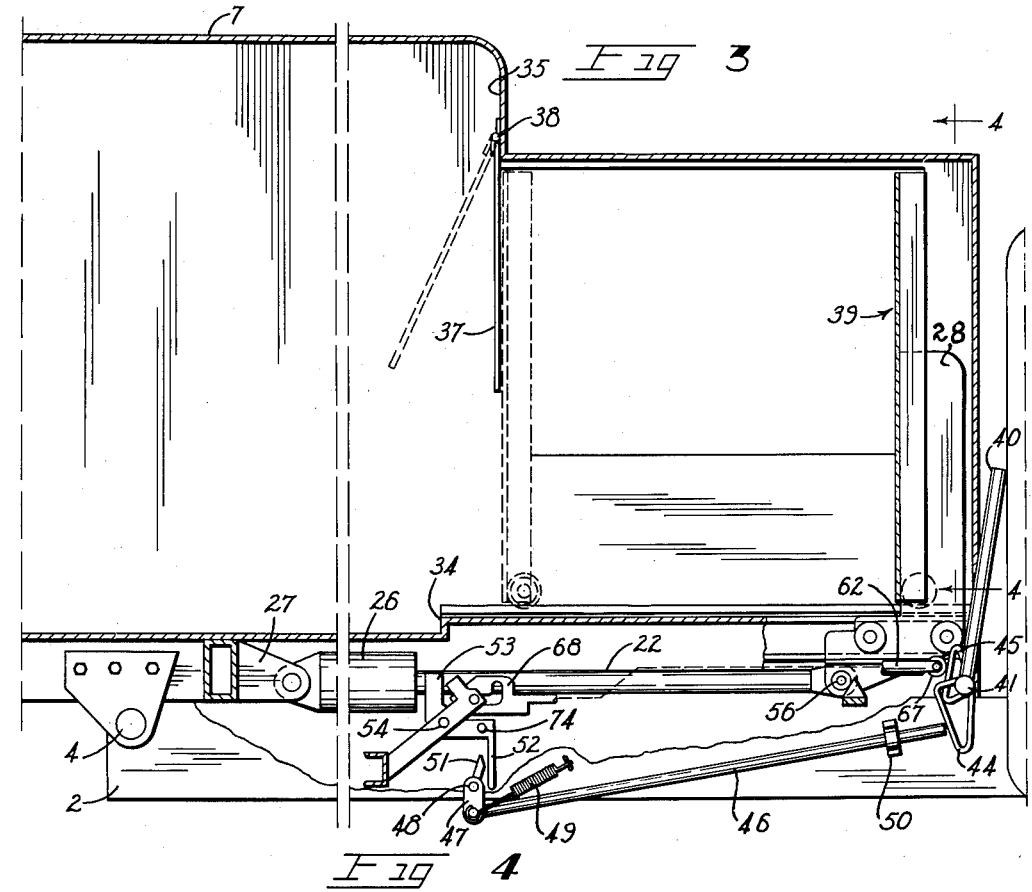
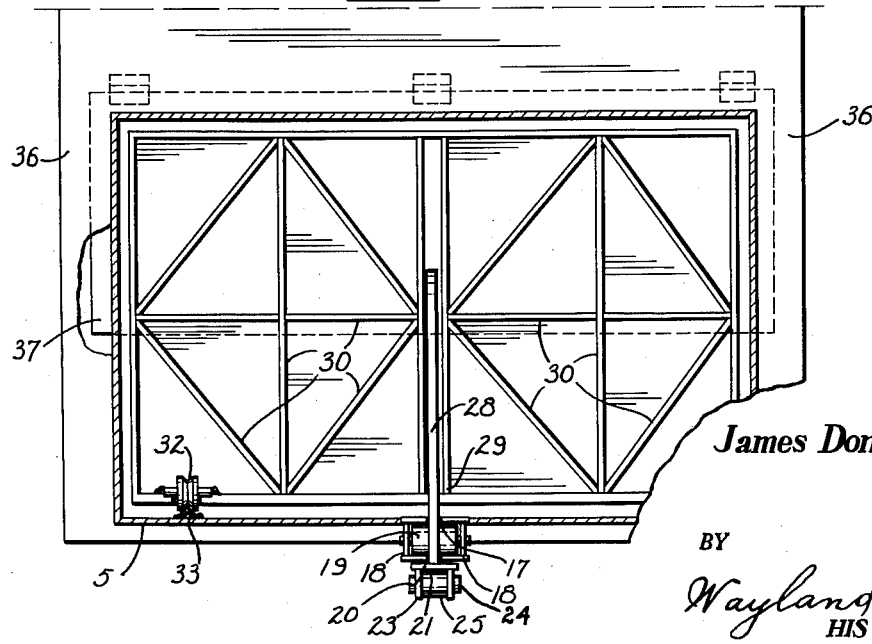
James Donle Huffines
INVENTOR.
BY
Wayland D. Keith
HIS AGENT

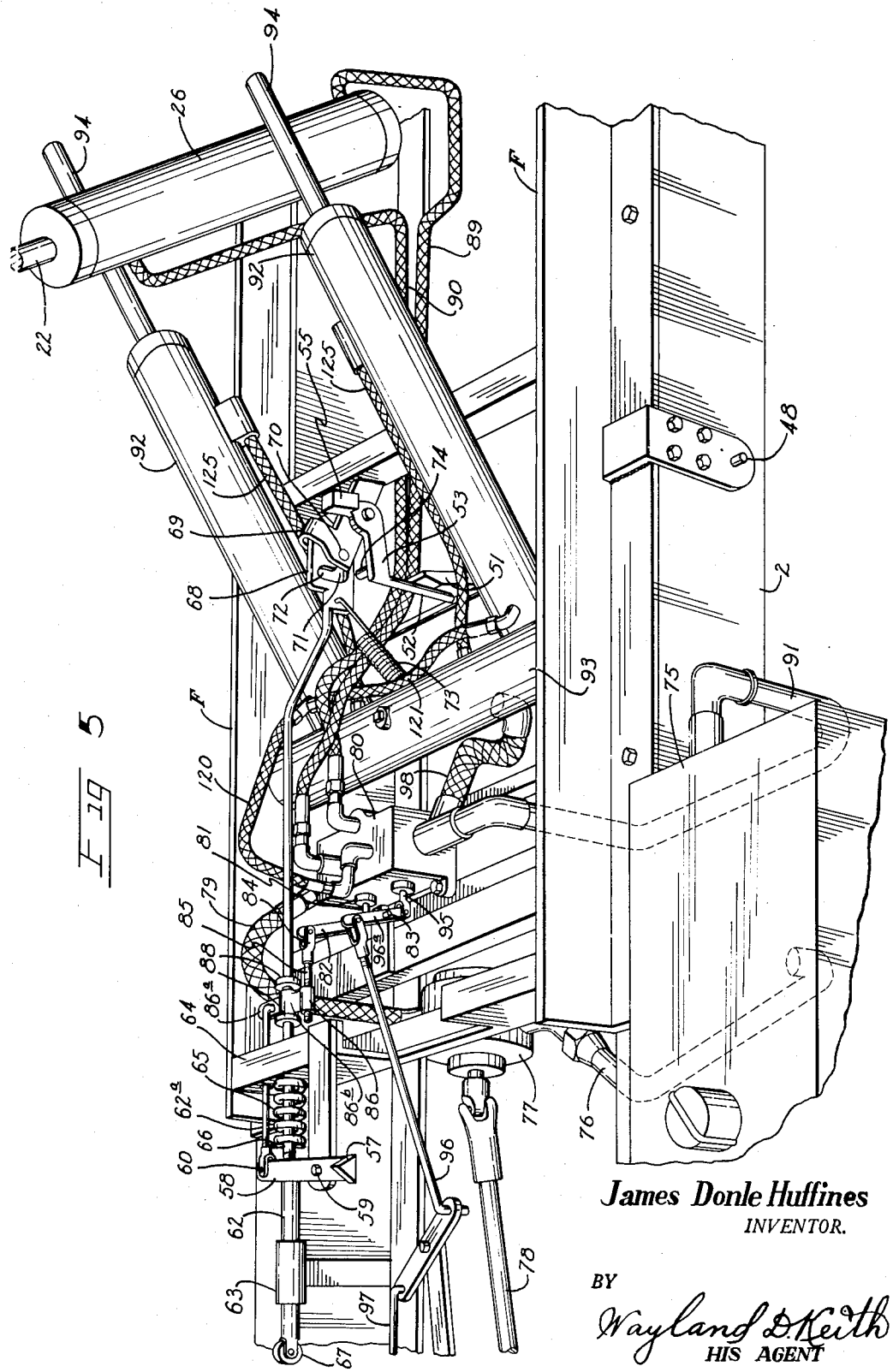

June 12, 1956  J. D. HUFFINES  2,750,055
REFUSE COMPRESSOR MECHANISM FOR VEHICLES
Filed Dec. 24, 1953  4 Sheets-Sheet 4
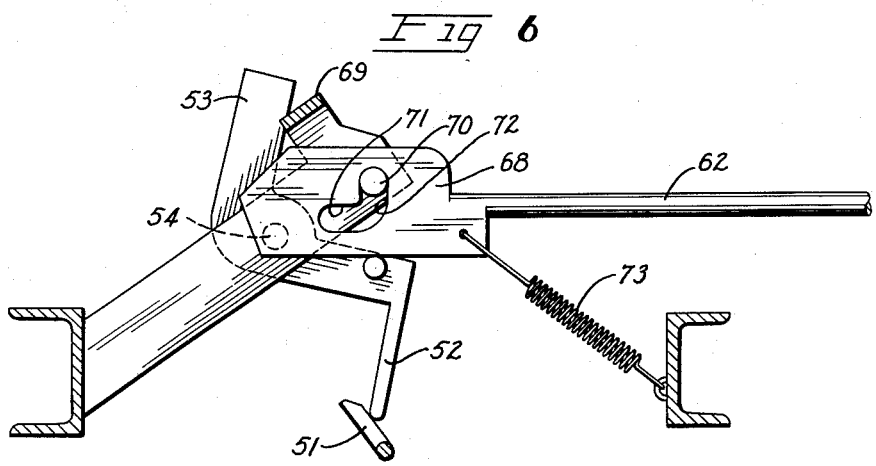
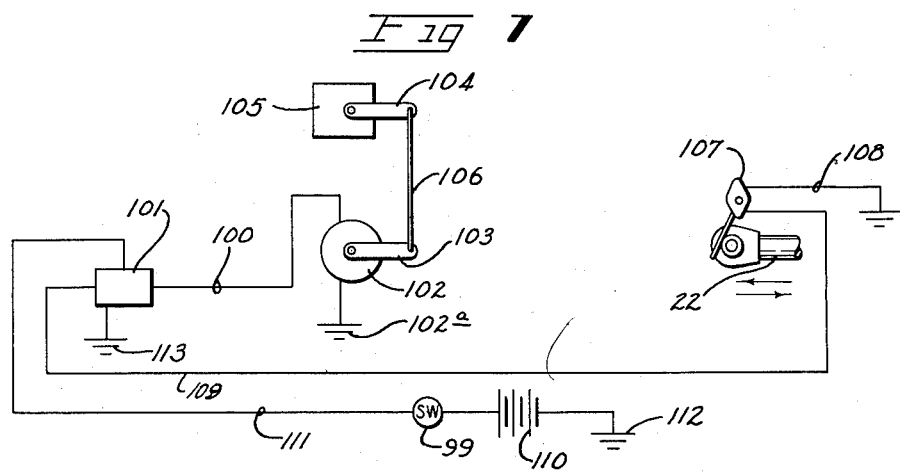
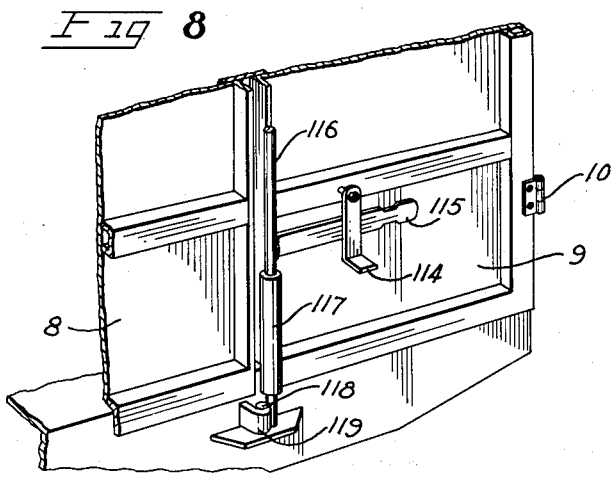
James Donle Huffines
INVENTOR.
BY
Wayland D. Keith
HIS AGENT

United States Patent Office 2,750,055
Patented June 12, 1956

2,750,055

REFUSE COMPRESSOR MECHANISM FOR VEHICLES

James Doule Huffines, Wichita Falls, Tex.

Application December 24, 1953, Serial No. 400,236

10 Claims. (Cl. 214—501)

This invention relates to improvements in garbage and trash hauling trucks and more particularly to garbage or trash hauling trucks that utilize a compressor mechanism to compress the refuse for transportation.

Various trucks of this character have been proposed heretofore, but these for the most part, were complex in construction, relatively easy to get out of order, and presented certain difficulties in loading and unloading the refuse, once it had been compressed into the carrying body of the truck.

An object of this invention is to provide a garbage truck unit wherein the compressor will compact the refuse to enable a greater load to be transported to the place of disposal.

Another object of this invention is to provide a compressor mechanism for a garbage or trash hauling truck that has a minimum of working parts to perform the compressing operation.

A still further object of the invention is to provide a compressing mechanism for a truck of the character specified that is hydraulically operated, both to compress the refuse and to elevate the body of the truck into dumping position.

Yet another object of the invention is to provide a truck body of the character specified, that is simple in construction, efficient in operation, the compressing and dumping mechanism of which is simple to operate, and which is relatively inexpensive to manufacture.

With these objects in mind and others that will manifest themselves as the description proceeds, reference is to be had to the accompanying drawings, in which like reference characters designate like parts in the several views thereof, in which:

Fig. 1 is a perspective view, taken from a side of the garbage and/or trash hauling truck with the body in transport position;

Fig. 2 is a fragmentary perspective view of the rear portion of the truck in dumping position, showing the bottom portion of the truck body, the side and the end thereof;

Fig. 3 is an enlarged, fragmentary, longitudinal sectional view of the front portion of the body of the truck, showing the compressor mechanism with parts broken away and shortened to show the details of construction;

Fig. 4 is a sectional view taken on the line 4—4 of Fig. 3, looking in the direction indicated by the arrows, and with parts broken away and shortened to show the details of construction;

Fig. 5 is a perspective view taken from a side and the top of the operating mechanism, and showing the cylinders for operating the compressing blade, and the cylinders for raising the body;

Fig. 6 is a fragmentary elevational view, with parts shown in section, of the reversing mechanism;

Fig. 7 is a diagrammatic view of an electric circuit that controls the opening and closing of the carburetor during the compressing cycle; and Fig. 8 is a fragmentary perspective view of the rear doors of the truck body, with parts shown in section, and showing the locking mechanism therefor.

With more detailed reference to the drawings, the numeral 1 designates a truck of the conventional character having the usual frame 2 upon which is mounted a dump body 3 that is pivotally mounted at 4 to the frame 2. The dump body 3 has a bottom floor 5, sides 6, top 7 and doors 8 and 9, which doors have hinges 10, that attach to the body 3, so as to permit the doors to swing about the axis of the hinges to enable the removal of the refuse from the body 3. The forward end of the body 3 has a loader compartment generally designated by the numeral 11, that has a top 12 and sides 13, that extend part of the way up from the floor 5, and a door 14 is provided on each side which doors are slidably mounted in guide channels 15, so it may be raised upward, as indicated in dashed outline in Fig. 1, and which may be locked in place by means of slide bolts 16. This enables trash or garbage to be loaded into the loader compartment 11 to a greater height than would otherwise be possible.

The floor 5 of the body has a medial slot 17 therein formed longitudinally of the loader compartment 11, which slot extends a short distance forward into the floor of the enlarged body portion 3. A channel 18 is mounted on each side of the slot 17 and has the flanges thereof facing each other to receive and guide rollers 19 which are mounted on a movable shoe 20. The shoe 20 is preferably elongated and has a pair of rollers 10 at each end thereof, as will best be seen in Fig. 3. The shoe 20 has a flat plate 21 beneath channels 18, so as to insure guided movement of the plunger rod 22 which is attached to the apertured lugs 23 by means of a pin 24 which extends through eye 25 on the outer end of plunger 22. The plunger 22 extends into a hydraulic cylinder 26, which cylinder is pivotally secured to bracket 27 mounted on the lower side of floor 5, as will best be seen in Fig. 3.

A bar member 28 is secured to shoe 20 and extends upward through slot 17 and is welded to a framework 29 of compressor blade 39, which framework is made rigid by braces 30 and sheet metal covering 31, which covering extends from side to side and substantially from top to bottom. Such construction resists deflection when the hydraulic plunger 22 moves the framework against the garbage or trash being compressed.

A pair of rollers is secured to the lower edge of framework 29 each of which rollers preferably have a peripheral V-groove therein so as to roll in guided relation on angle tracks 33 which are secured to the floor 5 of the loading compartment.

The plunger 22 has a slightly longer stroke than the length of the loader compartment 11, so the garbage or trash will be pushed into the body 7, which is enlarged. The body 7 has an off-set at 34 in the floor 5, and an off-set 35 which extends upward above the loader compartment. The body is also off-set on each side, as indicated at 36 substantially at the juncture of the body 7 and the loader compartment 11, as indicated in Fig. 4. A door 37 is hinged at 38 to the off-set portion 35 of body 3, so when closed, the door will rest on off-set portions 36 of the body, as indicated in Fig. 4. With the door arranged in this manner, the compressor blade, generally designated by the numeral 39, may be moved rearward until the trash or garbage is forced into the enlarged body portion 3, then, upon the return of the blade 39, the door and the off-set portions of the enlarged body 7 will retain the greater portion of the compressed matter in the body portion 3. As the loader compartment 11 is loaded and the material discharged into the enlarged portion 3, the refuse will be compressed and will follow a path substantially as indicated by the arrows in Fig. 3, until the body is completely loaded.

A lever 40 is positioned on each side of the loader compartment 11, each of which levers is secured to a transverse shaft 41 that is journaled beneath the forward end of the loader compartment. The levers 40 are maintained in an upright position by means of a spring 42 which is attached to lever 43, as is best seen in Fig. 2. The shaft 41 has cams 44 and 45 secured thereto for operation by either of the levers 40. The cam 44 is adapted to actuate a push rod that is pivotally connected to a lever 47 mounted on transverse shaft 48. The push rod 46 is maintained in its forward position by means of a tension spring 49, as will best be seen in Fig. 3. The forward end of the push rod 46 is journaled in a bearing 50. The transverse shaft 48 is mounted transversely of the frame 2 and is journaled therein and has a dog 51 secured thereto and upstanding therefrom, in position to engage an extension 52 on bell-crank lever 53. The bell-crank lever 53 is pivotally mounted on a pin 54.

An upstanding portion of the bell-crank lever 53, has an outwardly projected lug 55, which lug is within the path of outstanding roller 56, when the plunger rod 22 is moved back and forth. A lever 58 mounts an upstanding lug 57 at the forward end of the line of travel of roller 56, which lug 57 is pivoted on the lever 58, which is, in turn pivotally mounted on bolt 59. The opposite end of the lever 58 connects at 60 to rod 62a which rod 62a passes through cross member 64 and connects to outstanding lug 86a, on slidably mounted sleeve 86b to enable shifting to neutral, as will be more fully described hereinafter.

The rear end of the rod 62a is connected to an outstanding projection 86a, so upon movement of cam 57 forward, the rod 62a will move lug 86a within the range of loose linkage motion between abutments 88. The rod 85, which is attached to projection 86, will then move valve control lever 82 rearwardly to a neutral position, which will cut off the flow of hydraulic fluid to double acting cylinder 26. A spring 65 is telescoped over rod 62 and is retained in compressed position by a retainer pin 66, which urges the rod 62 forward so the roller 67 will be substantially in contact with cam member 45 mounted on transverse shaft 41. It is to be noted that the roller 67 engages the cam 45 above the axis of the shaft 41, therefore, when the top of either of the levers 40 is moved rearward, the rod 62 is moved rearward to compress spring 65 and to urge cam member 68 into engagement with cooperating loop member 69 which is mounted on frame F, so as to cause the pin 70 to move from slot 71 into the upper portion 72 of the slit 71. The spring 73 will retain the cam 68 in this position until released, as will be more fully described hereinafter.

With the cam 68 in lowered position, the bottom thereof will engage an outstanding projection 74 which is secured to bell-crank lever 53, whereupon the downwardly projecting lever 52 will be moved rearward.

Hydraulic fluid supply tank 75 is mounted on frame 2 and has an outlet pipe 76 leading from the bottom of the tank to a hydraulic pump 77 which is operated by the power take-off shaft 78 of the truck. The hydraulic pump 77 has a discharge hose 79 which leads therefrom to hydraulic valve assembly 80. The plunger 81 of a conventional type valve is moved within valve assembly 80 for controlling the flow of hydraulic fluid to and from double acting hydraulic cylinder 26. A lever 82 is pivotally mounted on bolt 83, and has an end thereof extending downwardly below the bolt 83 to pivotally connect with plunger 81 of the hydraulic valve. The upper end of the lever 82 is pivotally connected to a clevis 84 that threadably engages a rod 85 which is screw threaded into an outstaning lug 86 mounted between abutments 88 on rod 62. The outstanding lug 86 is mounted on rod 62 so as to permit a limited longitudinal movement, as hereinbefore described.

Hydraulic lines 89 and 90 lead from the hydraulic valve 80 to opposite ends of double acting cylinder 26, so upon movement of plunger 81, hydraulic fluid will be selectively directed through hydraulic lines 89 or 90, and returned through the opposite line, to actuate plunger 22. A discharge line leads from valve 80, and is designated at 91, which leads to the upper side of tank 75 to discharge fluid from hydraulic cylinder 26.

A pair of single acting cylinders 92 are pivotally mounted on tubular cross-member 93, which tubular cross-member serves as an over-flow tank to receive the discharged hydraulic fluid at the outer end of the stroke of the plunger to limit the outward movement of plungers 94 which are fitted within cylinders 92. The plungers 94 have their upper ends pivotally connected to the lower side of body 3, so as to raise the body into dumping position, as shown in Fig. 2. A valve plunger 95, which is operated by rod connections 96 and 97, which enables the operation of this valve from the cab seat in a manner well understood in the art. An overflow line 98 connects with the bottom of the tubular member 93 that serves as an over flow tank, and the other end of line 98 connects with line 91 so that discharged fluid will be returned to tank 75.

A switch 99 is mounted within circuit 100 and is manually closed to complete a circuit through ground 113 which will energize relay 101 which relay in turn will close contact points to connect wires 100 and 109. The wire 109 leads to a normally open switch 107, which switch has a wire 108 leading therefrom to the ground. Upon moving the valve plunger 81 to direct hydraulic fluid into the forward end of hydraulic cylinder 26. The plunger 22 will move rearward and away from the arm of switch 107 and will permit the switch arm to move, which will enable the closing of the switch contacts in switch 107, under the influence of a spring that is self-contained within the switch 107. Upon the closing of the contacts within the switch 107, a circuit will be completed through wire 109, switch 107, wire 108, ground 113 and through wire 102a, through solenoid 102, through wire 100 and through closed contact points within the switch within relay 101 to complete the circuit through line 111, switch 99, battery 110, and to ground 112. Upon the solenoid 102, which is of the arcuately movable type, becoming energized, the arm 103, which is attached to the armature 102, will move through an arc to move a linkage rod 106, which rod is connected to the butterfly valve control arm 104 of the carburetor. Upon the carburetor butterfly valve being opened, the motor will be accelerated, so as to increase the speed of the motor and of the hydraulic pump 77 to enable the flow of the hydraulic fluid to be increased, which will cause faster cycle of movement of the plunger 22, whereupon, on the return of the plunger 22 to the position shown in Figs. 3 and 7, the plunger will engage switch arm 107 to move the arm a sufficient distance to break the contact within switch 107, which will de-energize solenoid 102 to permit the butterfly throttle control valve arm 104 to return to normal position, the motor will likewise return to normal or set speed.

When it is desired to dump the load of trash or the like, the doors 8 and 9 are opened by moving lever 114 upward until lever 115, which is attached to rod 116, can be moved arcuately about the axis of rod 116, which rod is journaled in a bearing 117 mounted on door 9. The upper and lower ends of rod 116 each have a protruding cam 118 that engages the keepers 119 on the body 3. As the rod 116 is rotated, the cam 118 will disengage which engage the respective keepers 119 on the body 3, so as to permit the doors 8 and 9 to swing open on hinges 10.

*Operation*

With the truck in position as shown in Fig. 1, and with the compressor blade which is generally designated at 39, in its most forward position, the loader compartment 12 is charged with a quantity of trash or refuse to be hauled, then upon moving lever 40 to the rear, cam 45 will push rod 62 rearward, and in so doing, spring 65, that is constrained between abutment 66 on the rod 62 and cross member 64, will be compressed and cam 68 will be moved against loop member 68, which will force the cam downward so pin 70 will move into the upper portion 72 of the slot 71. The spring 73 will retain the cam 68 downward and the pin 70 will prevent longitudinal movement of rod 62, thereby maintaining the stronger spring 65 under compression. At the same time that the rod 62 is moved, abutments 88 will move lever 86 rearward, which lever is connected to rod 85 through clevis 84. With the lever to this position, the slide valve plunger 81 within hydraulic valve assembly 80 will be moved to open a passage to direct hydraulic fluid from pump 77. With the drive shaft 78 rotating, the hydraulic fluid will be discharged under pressure into hydraulic line 79, through hydraulic valve 80 and into hydraulic line 90, so as to move plunger 22 rearward. The plunger 22 is connected to the compressor blade 39, therefore the compressor blade will be moved rearwardly substantially as indicated from the full line position as shown in Fig. 3, to substantially that as shown in dashed lines in the same figure. The refuse will be pushed rearward of swinging door 37 into the enlarged portion 7 of the body. After the successive loadings of the loader compartment 11 are discharged into enlarged body portion 7, the compacted refuse will move upward and around therein, substantially as indicated by the arrows, until the maximum capacity of the compartment 7 is reached. The flap door 37, will then move against off-set portions 36 to prevent retrogression of refuse into loader compartment 11.

The off-set portions 34, 35 and 36 of the body 7, will prevent retrogression of refuse along the walls, floor and top of the body, thereby obviating the necessity of holder lugs.

When the plunger 22 reaches the rearmost position of its compression stroke, the roller 56 will engage the outwardly projecting lug 55 to move the bell-crank lever 55 and projection 74 upward into engagement with the bottom portion of cam plate 68. Upon urging the cam plate 68 upward, the cam plate will be moved until the slot 72 is moved into a position so pin 70 will move into horizontal slot 71, whereupon the spring 73 will move pin 70 into horizontal slot 71, whereupon, the spring 73 will move cam plate 68 forward within the limit of notch 71, and in so doing, the strong spring 65 will move the rod 62 and rod 62a and the valve mechanism suddenly through neutral position into full reverse position, thereby obviating the hydraulic valve hanging on "dead center." The hydraulic fluid will then be directed out of cylinder 26 through line 90 and into valve 80; thence out through valve 80 to discharge through line 91 into tank 75. The hydraulic fluid under pressure will be discharged from hydraulic valve 80 into hydraulic line 89 and into the rear end of cylinder 26 to move plunger 22 outward or forward, into the position as shown in Fig. 3. At the foremost end of the stroke of the plunger 22, the roller 56 will engage the arm of switch 107 to break the circuit to relay 101, whereupon, the solenoid 102 will move carburetor arm 104 into retarding position to reduce the speed of the motor. The switch 107 is normally closed, and as soon as the plunger 22 disengages the arm of the switch the switch closes. When the roller 56 moves forward to engage lug 57 on lever 58, the lever 58 is moved a small amount within the limits of abutments 88 on rod 62. The outstanding lug 86, rod 85, clevis 84 and lever 82 are moved to such an extent as to move valve plunger 81 into neutral position, whereupon the plunger 22 will be maintained in this position until the cycle of operation is repeated by moving the lever 40.

At any time prior to the plunger reaching the rear-most end of its compression stroke, the valve plunger 81 may be shifted by moving lever 40 forward, which in turn causes cam 44 to push rod 46 rearward, which actuates lever 47 about the axis of shaft 48. As soon as the lever 47, which is secured to the shaft 48, is moved, the dog 51, which is secured to the upper side of the shaft, is moved forward to engage the downwardly protruding extension 52 of bell-crank lever 53, which will move cam plate 68 upward to a position as shown in Fig. 3, which will cause the valve plunger 81 to shift the flow of hydraulic fluid, which will return the plunger 22 and the compressor blade 39 to the position as indicated in full outline in Fig. 3.

The feature described in the preceding paragraph is particularly valuable as a safety feature, so as to prevent the plunger from making a full stroke, should doing so endanger life or limb of the operator or loaders, or if it has been discovered that some object within the lodar compartment needs to be removed. After the enlarged body portion 7 is filled to the desired capacity, and the truck is transported to the place of disposal of the refuse, trash or garbage, a control mechanism (not shown) that may be located in the cab of the truck or other convenient position, may be operated to move rods 97 and 96, which in turn operates valve lever 96a, which valve lever is similar in construction to valve lever 82. The valve lever 96a is pivoted on pin 83 so as to move plunger 95 in and out of hydraulic valve member 80, and with the valve plunger 95 moved into position to direct hydraulic fluid out through hydraulic hose 120 and 121 into cylinders 92, simultaneously, the respective plungers 94 which are pivotally connected to the lower portion of body 3, are moved outward, whereupon the body 3 is pivoted about pivot point 4 until the body reaches the approximate position as shown in Fig. 2, whereupon props 122 that are hinged at 122' are moved into position to rest upon support seats 123 on the side of frame 2, and with the doors having been opened prior to the raising operation, the refuse will slide from the truck body into a suitable dump pit, incinerator, or the like.

Upon completion of the dumping operation, the props 122 may be swung about pivot 122' into the respective retaining seats 124, whereupon the body 3 may be lowered by manipulation of valve 95, which permits the hydraulic fluid to discharge back through lines 121 and 120 through valve 80 and to discharge outward through hydraulic discharge line 91 into tank 75.

The hydraulic cylinders 22 are provided with safety over-flow ports in a side thereof, at the maximum outward stroke, and over-flow lines 125 are connected therewith and to tubular member 93 which serves as an over-flow tank. The tubular member 93 is also connected to tank 75 through hydraulic lines 98 and 91.

It is to be noted that the hydraulic mechanism for actuating both the compressor blade 39 and for raising and lowering the body 3 is mounted on frame F that may be readily attached to a conventional truck frame 2, by anyone skilled in this particular field of endeavor, with the drilling of a minimum number of holes, thereby making the present unit interchangeable on various types of truck chassis.

While the invention has been described in connection with a specific type of refuse compressor of a particular construction, it is to be understood that the various aspects of the invention may be utilized with other types of construction of compressors and receivers, without departing from the scope of the appended claims.

Having thus described the invention, what is claimed is:

1. A mechanism for actuating a refuse compressor for use on a vehicle body comprising, a hydraulic fluid reservoir, a power driven hydraulic pump, said pump having an inlet line connected in fluid communication with said reservoir, a valve mechanism, a conduit connecting said valve mechanism with said pump, a longitudinal slot formed in the lower portion of said vehicle body, a hydraulic cylinder mounted beneath said body in parallel alignment with said slot, a plunger operatively mounted in said hydraulic cylinder, an upstanding arm connected to said plunger and projecting through said slot, a transverse compressor blade mounted within said body and secured to said arm, a pair of conduits each having one end thereof connected with said valve mechanism, each opposite end of said conduits being connected to an end of said hydraulic cylinder, a discharge line leading from said valve mechanism to said reservoir, means connected to said valve mechanism to initiate a complete cycle of said plunger in said hydraulic cylinder, and said valve being held in one position for the length of travel of said compressor stroke, a compressed spring for switching said valve mechanism so as to reverse the flow of said hydraulic fluid to said cylinder, means for retaining said spring under compression, and a trip mechanism for releasing said compressed spring at the end of the compression stroke of said plunger.

2. A mechanism for actuating a refuse compressor for use on a vehicle body, comprising a hydraulic fluid reservoir, a power driven hydraulic pump, said pump having an inlet line connected in fluid communication with said reservoir, a valve mechanism, conduits connecting said valve mechanism with said pump, a longitudinal slot formed in the lower portion of said vehicle body, a hydraulic cylinder mounted beneath said body in parallel alignment with said slot, a plunger operatively mounted in said hydraulic cylinder, an upstanding arm connected to said plunger and projecting through said slot, a transverse compressor blade mounted within said body and secured to said arm, a pair of conduits each having one end thereof connected with said valve mechanism, each opposite end of said conduits being connected to an end of said hydraulic cylinder, a discharge line leading from said valve mechanism to said reservoir, a shaft mounted on said vehicle transversely of said body and journaled on said vehicle for movement relative to said body, a lever mounted on said shaft on each side of said body, a lever on said shaft intermediate said first mentioned levers, a rod operatively connecting said valve mechanism to initiate a complete cycle of said plunger in said hydraulic cylinder, a second lever positioned intermediate said two first mentioned levers, and a second rod operatively connecting with said valve mechanism to enable manual reversing of said valve mechanism by the actuation of said levers mounted on either side of said body.

3. A mechanism for actuating a refuse compressor for use on a vehicle body comprising, a hydraulic fluid reservoir, a power driven hydraulic pump, said pump having an inlet line connecting in fluid communication with said reservoir, a valve mechanism, conduits connecting said valve mechanism with said pump, a longitudinal slot formed in the lower portion of said vehicle body, a hydraulic cylinder mounted beneath said body in parallel alignment with said slot, a plunger operatively mounted in said hydraulic cylinder, an upstanding arm connected to said plunger and projecting through said slot, a transverse compressor blade mounted within said body and secured to said arm, a pair of conduits each having one end thereof connected with said valve mechanism, each opposite end of said conduits being connected to an end of said hydraulic cylinder, a discharge line leading from said valve mechanism to said reservoir, a shaft mounted on said vehicle transversely of said body and journaled on said vehicle for movement relative to said body, a lever mounted on said shaft on each side of said body, a lever on said shaft intermediate said first mentioned levers, a rod operatively connecting said valve mechanism to initiate a complete cycle of said plunger in said hydraulic cylinder, and an abutment positioned on said vehicle body within the travel of said plunger so as to automatically arrest the movement of said plunger upon the completion of the cycle thereof.

4. A refuse collecting vehicle including a closed body having top, bottom, side and end walls with an opening in one of the end walls, a loading compartment having an end, top, bottom, side walls and an open end communicating with said body through the opening of its end wall, the open end and opening being of substantially the same size, a compressor blade slidably mounted in the loading compartment for longitudinal reciprocation therein toward and away from its open end, means for actuating the compressor blade, and a door hingedly mounted on the end wall of said body at the upper end of and in overlying relation to its opening for swinging movement within said body, and means at the opening for preventing movement of the door into said compartment.

5. A refuse collecting vehicle as set forth in claim 4 wherein the bottom wall of the body has an offset adjacent the opening for retaining refuse in said body in coaction with the door.

6. A refuse collecting vehicle as set forth in claim 5 wherein the offset portion of the bottom wall of the body is spaced from the opening.

7. A refuse collecting vehicle as set forth in claim 4 wherein the bottom and side walls of the loading compartment are offset inwardly of the bottom and side walls of the body for retaining refuse in said body in coaction with the door and providing the means for preventing movement of said door into said compartment.

8. A refuse receptacle including a closed body having side and end walls, a loading compartment at one end of the body and having an end and side walls, a discharge opening at one end of the loading compartment forming an inlet opening in the adjacent end wall of the body, pusher means reciprocal in said compartment toward and away from the opening for forcing refuse through said opening into said body, means for actuating the pusher means, retaining means pivotally mounted in said body at the upper end of said opening for overlying the upper portion thereof and for swinging movement upon reciprocation of the compressor means and the forcing of refuse through said opening, and means limiting movement of the retaining means toward said compartment and opening.

9. A refuse receptacle as set forth in claim 8 wherein the body and loading compartment include substantially horizontal bottom walls, the body bottom wall being offset downwardly of the compartment bottom wall for retaining refuse in said body in coaction with the retaining means.

10. A refuse receptacle including a closed body having side and end walls, a loading compartment at one end of the body and having an end and side walls, a discharge opening at one end of the loading compartment forming an inlet opening in the adjacent end wall of the body, pusher means reciprocal in said compartment toward and away from the opening for forcing refuse through said opening into said body, means for actuating the pusher means, retaining means pivotally mounted in said body at the upper end of said opening for overlying the upper portion thereof and for swinging movement upon reciprocation of the compressor means and forcing of refuse through said opening, the side walls of said compartment being offset inwardly of the side walls of said body for retaining refuse in said body in coaction with the retaining means, said retaining means overlying certain of said side walls so as to be prevented from swinging through said opening into said compartment.

(References on following page)

References Cited in the file of this patent

UNITED STATES PATENTS

| | | |
|---|---|---|
| 1,119,353 | Jackson | Dec. 1, 1914 |
| 1,172,412 | Von Saalfeld | Feb. 22, 1916 |
| 1,937,016 | Gibby | Nov. 28, 1933 |
| 2,050,806 | Rey | Aug. 11, 1936 |
| 2,166,846 | McCalley | July 18, 1939 |
| 2,258,988 | Le Laurin | Oct. 14, 1941 |
| 2,339,360 | Sicard | Jan. 18, 1944 |
| 2,374,909 | Williams | May 1, 1945 |
| 2,480,527 | Wachter | Aug. 30, 1949 |
| 2,487,411 | Balbi | Nov. 8, 1949 |
| 2,511,556 | Wood | June 13, 1950 |
| 2,622,748 | Feidert | Dec. 23, 1952 |
| 2,644,594 | Komuchar et al. | July 7, 1953 |
| 2,648,452 | Gibson et al. | Aug. 11, 1953 |